United States Patent [19]
Cargnelli et al.

[11] Patent Number: 5,753,383
[45] Date of Patent: May 19, 1998

[54] HYBRID SELF-CONTAINED HEATING AND ELECTRICAL POWER SUPPLY PROCESS INCORPORATING A HYDROGEN FUEL CELL, A THERMOELECTRIC GENERATOR AND A CATALYTIC BURNER

[76] Inventors: Joseph Cargnelli, 59 Lupp Street, Toronto, Ontario, Canada, M6N 3WS; Pierre Rivard, 107 Sunfield Road, Toronto, Ontario, Canada, M3M 2V2; Boyd Taylor, 9 Chadburn Crescent, Aurora, Ontario, Canada, L4G 474

[21] Appl. No.: 758,659

[22] Filed: Dec. 2, 1996

[51] Int. Cl.⁶ .................. H01M 8/02; H01L 35/02
[52] U.S. Cl. .................. 429/13; 429/26; 136/201; 136/205; 136/242
[58] Field of Search .................. 429/13, 26, 12; 136/201, 205, 224, 242

[56] References Cited

U.S. PATENT DOCUMENTS

| | | |
|---|---|---|
| 3,217,696 | 11/1965 | Kiekhaefer . |
| 4,080,487 | 3/1978 | Reiser ............... 429/26 X |
| 4,211,828 | 7/1980 | Peck . |
| 4,622,472 | 11/1986 | Bronicki . |
| 4,818,638 | 4/1989 | Roy . |
| 5,200,278 | 4/1993 | Watkins et al. . |
| 5,231,954 | 8/1993 | Stowe . |
| 5,242,764 | 9/1993 | Dhar . |
| 5,314,762 | 5/1994 | Hamada et al. . |
| 5,316,870 | 5/1994 | Ohga ............... 429/26 X |
| 5,318,863 | 6/1994 | Dhar . |
| 5,458,095 | 10/1995 | Post et al. . |
| 5,470,671 | 11/1995 | Fletcher et al. . |
| 5,514,486 | 5/1996 | Wilson . |

FOREIGN PATENT DOCUMENTS

| | | |
|---|---|---|
| 1098723 | 4/1981 | Canada . |
| 1100179 | 4/1981 | Canada . |
| 1096445 | 10/1981 | Canada . |
| 1162236 | 2/1984 | Canada . |
| 1171672 | 7/1984 | Canada . |
| 1199668 | 1/1986 | Canada . |
| 1228833 | 11/1987 | Canada . |
| 1229874 | 12/1987 | Canada . |
| 1270522 | 6/1990 | Canada . |
| 2017072 | 11/1990 | Canada . |
| 1299648 | 4/1992 | Canada . |
| 2096724 | 5/1992 | Canada . |
| 2037382 | 9/1992 | Canada . |
| 2006348 | 10/1992 | Canada . |
| 1321813 | 8/1993 | Canada . |
| 2093193 | 10/1993 | Canada . |
| 2130809 | 4/1995 | Canada . |
| 2150082 | 12/1995 | Canada . |
| WO/95/17021 | 6/1995 | WIPO . |

*Primary Examiner*—John S. Maples
*Attorney, Agent, or Firm*—Jeffrey T. Imai; Arne I. Fors; Robert P. Stratton

[57] ABSTRACT

A power supply includes a fuel cell stack, a thermoelectric module and a burner module. The fuel cell stack generates a primary source of electricity and secondary source of heat. The thermoelectric module generates a secondary source of electricity. The burner module is juxtaposed to the fuel cell stack and the thermoelectric module, to provide primary heat to the system and to generate a temperature differential across the thermoelectric module, and to pre-heat a fuel and an oxidant for the fuel cell stack. The burner module is regulated to maintain a given system temperature, or when needed by the thermoelectric generator for secondary power generation.

5 Claims, 7 Drawing Sheets

HYBRID SELF-CONTAINED HEATING AND ELECTRICAL POWER SUPPLY PROCESS INCORPORATING A HYDROGEN FUEL CELL, A THERMOELECTRIC GENERATOR AND A CATALYTIC BURNER

FIELD OF THE INVENTION

The present invention relates to hydrogen power sources of a type which receives hydrogen fuel and produces electricity and heat. In particular, this invention relates to a hybrid power supply which is particularly suited for sub-zero temperature environments.

BACKGROUND OF INVENTION

Thermoelectric generators, photovoltaics and primary batteries are used as a source of primary power in remote areas where the usual sources of power are inappropriate or unavailable, where service and maintenance of equipment is limited, or where the transportation cost of the fuel is a major component of the overall system's operating cost. Examples of remote applications include: unattended communication repeaters, navigational aids, and weather and oceanographic stations. For such applications, the power system must be self-contained and highly reliable. Fuel cells however, although used in large (larger than 250 KW) stationary applications and space are not commonly used in remote areas to date, because of their perceived lack of reliability and of their susceptibility to low temperatures when shut down.

Generally, a fuel cell is a device which converts the energy of a chemical reaction into electricity. It differs from a battery in that the fuel cell can generate power as long as the fuel and oxidant are supplied. A fuel cell produces an electromotive force by bringing the fuel and oxidant into contact with two suitable electrodes and an electrolyte. A fuel, such as hydrogen gas, for example, is introduced at a first electrode where it reacts electrochemically in the presence of the electrolyte to produce electrons and cations in the first electrode. The electrons are circulated from the first electrode to a second electrode through an electrical circuit connected between the electrodes. Cations pass through the electrolyte to the second electrode. Simultaneously, an oxidant, such as oxygen gas or air, is introduced to the second electrode where the oxidant reacts electrochemically in presence of the electrolyte consuming the electrons circulated through the electrical circuit and the cations at the second electrode. The anions formed at the cathode react with the cations to form a reaction product. The first electrode may alternatively be referred to as an oxidizing or fuel electrode, and the second electrode may alternatively be referred to as an oxidant or reducing electrode. The half-cell reactions at the two electrodes are, respectively, as follows:

$$H_2 \rightarrow 2H^+ + 2e^-$$

$$\tfrac{1}{2}O_2 + 2H^+ + 2e^- \rightarrow H_2O$$

The external electrical circuit withdraws electrical current and thus receives electrical power from the cell. The overall fuel cell reaction produces electrical energy which is the sum of the separate half-cell reactions written above. Water and heat are typical by-products of the reaction.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a cooling medium. Also within the stack are current collectors, cell-to-cell seals, insulation, piping, and instrumentation. The stack, housing, and associated hardware make up the fuel cell module.

Fuel cells may be classified by the type of electrolyte, either liquid or solid. A fuel cell using a solid electrolyte, such as a solid polymer referred to as a proton exchange membrane is kept moist with water because the membrane will not operate efficiently when dry. The membrane requires constant humidification during the operation of the fuel cell, normally by adding water to the reactant gases, usually hydrogen and oxygen, that pass by the membrane on each side of the membrane/electrode assembly.

The proton exchange membrane used in a solid polymer fuel cell acts as the electrolyte as well as a barrier for preventing the mixing of the reactant gases. An example of a suitable membrane is a copolymeric perfluorocarbon material containing a basic unit of fluorinated carbon chain and a sulphonic acid group. There may be variations in the molecular configurations of this membrane. Excellent performances are obtained using these membranes if the fuel cells are operated under fully hydrated, essentially water-saturated conditions and ambient temperatures. As such, the membrane must be continuously humidified. Further more, the temperature of the fuel cell stack must be kept above freezing in order to prevent freezing of the stack.

Cooling, humidification and pressurization requirements increase the cost and complexity of the fuel cell, reducing its commercial appeal as an alternative energy supply in many applications. Accordingly, advances in fuel cell research is enabling fuel cells to operate without reactant conditioning, no flow-field provisions, and under air-breathing, atmospheric conditions while maintaining usable power output.

The current state-of-the-art in fuel cells, although increasingly focusing on simplified air-breathing atmospheric designs, has not adequately addressed operations in sub-zero temperatures, which requires further complexity of the design. For instance, heat exchangers and thermal insulation are required, as are additional control protocols for startup, shut-down, and reactant humidifiers.

A catalytic burner operates on a principle similar to fuel cells, but at an accelerated kinetic rate and increased temperature. A fuel, for example hydrogen, is oxidized through direct contact with oxygen or air at a rate induced by the presence of a catalytic bed separating the two reactants, for example, ceramic beads containing small amount of platinum on the surface.

The by-product of the chemical reaction is similar to that of a fuel cell:

$$\tfrac{1}{2}O_2 + H_2 \rightarrow H_2O + HEAT$$

The higher consumption rate of the reactants and concomitant heat release reflects the fact that the reaction occurs through direct contact rather than through a proton/electron transaction. Catalytic burning is flameless, and occurs at a temperature between that of a fuel cell's "cold combustion" and that of an open-flame combustion. Flow rate can be pulsed or modulated to achieve varying temperature profiles. Hydrogen catalytic burning requires no pilot flame or spark to be initiated.

The Peltier module of a thermoelectric generator functions on the basis of the Seebeck effect, where the electromotive force (emf) potential is proportional to the temperature differential of the module:

$$dE = \alpha dT$$

One thermoelectric element commonly used is a solid-state device manufactured by MELCOR.

A temperature differential between the hot catalytic burner and the cool sub-zero air or cooling fins side of a thermoelectric element generates a low-potential current which can be used to service a load.

In generating electricity, fuel cells and thermoelectric generators each possess comparative advantages and disadvantages. For instance, compared to fuel cells, thermoelectric generators are electrically inefficient, converting less than 4% of the chemical energy available from the fuel into electricity, exhausting to the environment most of the fuel's energy as unused heat. They also require a spark or ignition source to fire up when operated on fuels other than hydrogen. The thermoelectrics' very low efficiency, low power output and considerable fuel cell requirements are particularly detrimental to applications where the fuel must be transported over long, inaccessible distances such as mountain top or Arctic applications. On the other hand, thermoelectric generators are very reliable and economical, have no moving parts and are operable in cold climates because of the catalytic burners' heat producing characteristics.

Fuel cells, in contrast, suffer from pre-commercial unreliability, limited longevity and an inability to start spontaneously in deep sub-zero temperatures. Sub-zero temperatures upon shut down can freeze a stack and cause damage to the structural components and electrode components. On the other hand, fuel cells offer significantly higher efficiency in converting the fuel's chemical energy to electricity converting between 40 to 60% compared to the thermoelectric's 4%.

Separately-used, fuel cells, thermoelectric generators or catalytic burners are commercially available. Prior art examples, such as Hamada et al., U.S. Pat. No. 5,314,762, offers a combination of a catalytic burner with a fuel cell, both operating on hydrogen where the burner is used to preheat the fuel cell. Still others such as Bromberg et al., WO 95/17021, offer the combination of a plasmatron and a fuel cell. However, none disclose the combination of fuel cell, thermoelectric generator and catalytic burner, the combination of which offers unique advantages for off-grid powering in extreme climates.

SUMMARY OF THE INVENTION

The disadvantages of the prior art when applied to cold-weather, off-grid power may be overcome by providing a hybrid electrical power source which receives hydrogen fuel and produces electricity and heat.

It is desirable to provide electricity and heating sources providing a degree of mutual redundancy to one another, allowing the self-contained system to operate in the cold and to achieve levels of reliability, fuel economy and operability unachievable by the previous state of the art without significant complexity and capital cost increases.

According to one aspect of the invention, there is provided a power supply which includes a fuel cell stack, a thermoelectric module and a burner module. The fuel cell stack generates a primary source of electricity and secondary source of heat. The thermoelectric module generates a secondary source of electricity. The burner module is juxtaposed to the fuel cell stack and the thermoelectric module to provide the primary source of heat for the system, to pre-heat a fuel and an oxidant for the fuel cell stack, and to generate a temperature differential across the thermoelectric module. The burner module can be regulated to maintain the system's operating temperature.

According to another aspect of the invention, there is provided a catalytic burner to heat the system and to increase the temperature of the hot side of a thermoelectric element, a thermoelectric generator to generate electricity, and a fuel cell to generate electricity and heat.

According to another aspect of the invention, the fuel supplied to the burner is intermittently supplied by regulating a solenoid or proportionating valve responsive to a temperature measurement at the central core of the fuel cell stack or at another strategic location in the system.

According to another aspect of the invention, the catalytic burner is coupled to the hot side of a thermoelectric element through a thermal mass, for instance, an aluminum plate. The cool side of the element is intimately bonded to cooling fins or to other active/passive cooling device, to increase the temperature differential across the element.

According to another aspect of the invention, the single thermoelectric element can be cascaded by a number of elements in series or in parallel, to achieve a specified voltage or amperage rating.

According to another aspect of the invention, the fuel for the fuel cell is brought dead-ended, i.e. non-circulating, to the oxidizing electrodes, at constant near-ambient or atmospheric pressure.

According to another aspect of the invention, there is provided a method of generating heat and electrical energy. The method includes the steps of supplying a fuel to a burner for generating a temperature differential across a thermoelectric element thereby generating a secondary source of electricity, heating a system's enclosure or micro-climate, pre-heating a fuel for consumption by a fuel cell stack, supplying the pre-heated fuel to a heated fuel cell stack thereby generating a primary source of electricity and secondary source of heat, regulating the fuel supplied to the burner to maintain a set temperature in the system's enclosure and at the hot side of the thermoelectric element and in the fuel cell stack.

According to another aspect of the invention, there is provided an open-flame burner operating at a relatively high heat release regime to increase the temperature of the hot side of a thermoelectric element.

According to another aspect of the invention, the fuel and oxidant for the fuel cell can be brought under higher-than-atmospheric pressure, with the oxidant, either air or oxygen, at a pressure higher than that of the fuel.

According to yet another aspect of the invention, the thermoelectric element is electrically connected to the fuel cell stack, so that the fuel cells' current can be applied to the Peltier modules to create a temperature gradient or differential across the element, and by reversing the direction of the current fed from the fuel cells to the thermoelectric elements, the power source can provide some degree of heating or cooling of surfaces as required by some applications.

BRIEF DESCRIPTION OF THE DRAWINGS

The accompanying drawings, which are incorporated in and form a part of the specification, illustrate the embodiments of the present invention, and, together with the description, serve to explain the principles of the invention. It is to be noted that the drawings illustrate only typical embodiments of the invention and are therefore not to be considered limiting its scope, for the invention will admit to other equally effective embodiments. In the drawings.

DETAILED DESCRIPTION OF THE INVENTION

Figure 1:
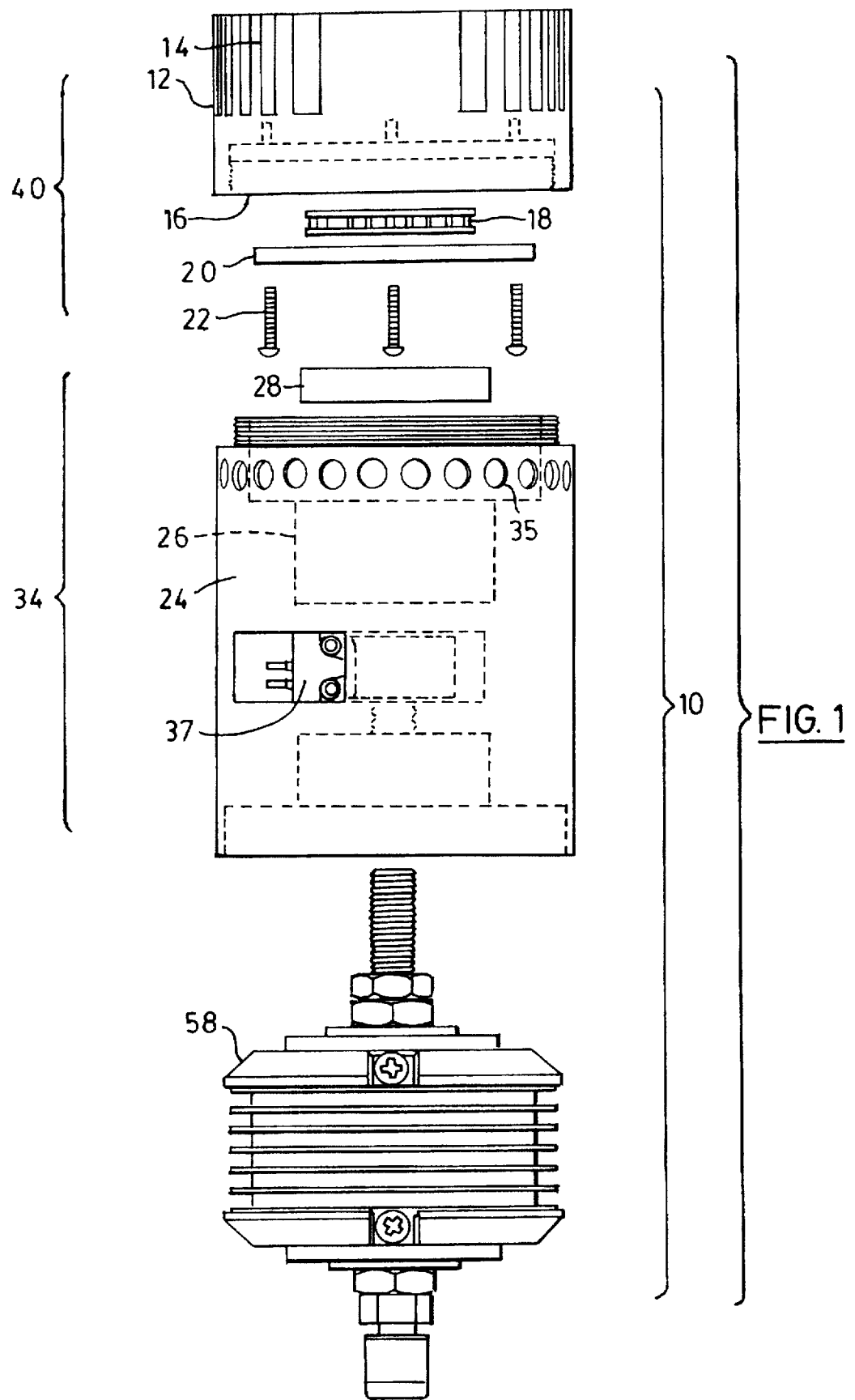
FIG. 1 is an exploded plan view of a first embodiment of the present invention.
Figure 2:
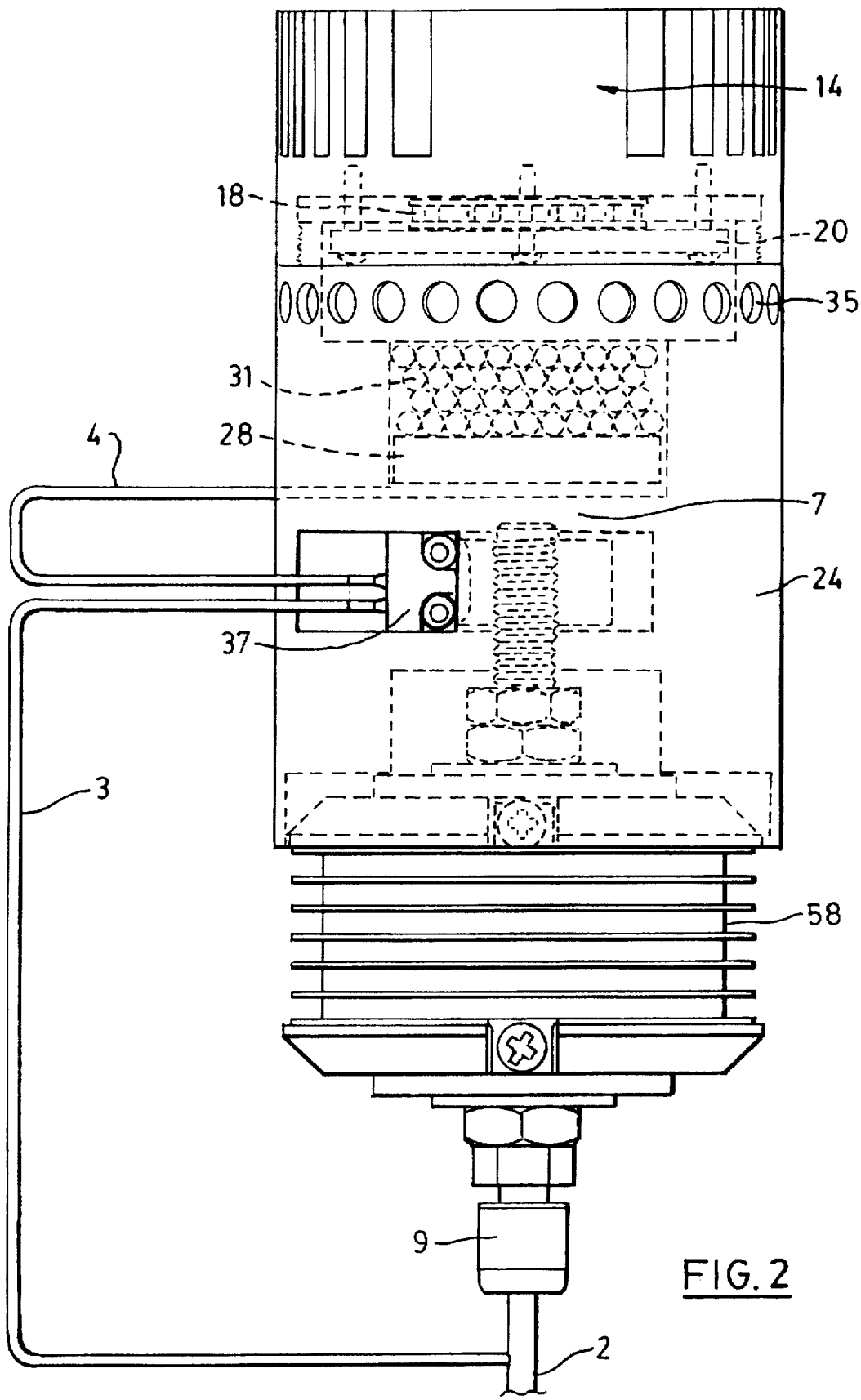
FIG. 2 is a plan view of an assembled system of the embodiment of FIG. 1.

Referring to FIGS. 1 and 2, there is shown the power supply 10 and its constituent elements, namely a fuel cell stack 58, a burner module 34 and a thermoelectric module 40.

Thermoelectric module 40 has a housing 12 having fins 14 on an outer side and a cavity 16 on an inner side. Thermoelectric element 18 is mounted in cavity 16 which is closed with a thermal mass 20. Screws 22 fasten thermal mass 20 to housing 12.

The burner module 34 comprises a housing 24 having an axial cavity 26 for receiving burner 28 and a bed of catalytic beads 31. Housing 24 has a flange 33 for spacing the burner module 34 from the thermoelectric module 40. Flange 33 has a plurality of venting and breathing holes 35 to ensure adequate oxidant and fuel to the bed of catalytic beads 31 as well as venting the water vapor produced. Axial cavity 26 has a gas inlet 3 to the burner module 34.

The assembled thermoelectric module 34 screws onto housing 24. Housing 24 has a central cavity for retaining a solenoid or proportioning valve 37 for controlling the supply of the fuel to the burner module 34. The housing 24 acts as a thermal mass to distribute the heat generated by the burner 28 back to the fuel cell stack 58.

The housing 24 has a threaded opening 7 to receive fuel cell stack 58 in a threaded engagement, similar to the manner of the engagement with the thermoelectric module 40, so that the three components assemble to form a monolithic system, as depicted in FIG. 2.

Fuel line 2 introduces fuel to inlet 9 of fuel cell 58. A secondary fuel line 3 branches to solenoid 37. The outlet line of solenoid 37 is fed into burner 28 by fuel line 4.

Figure 3:
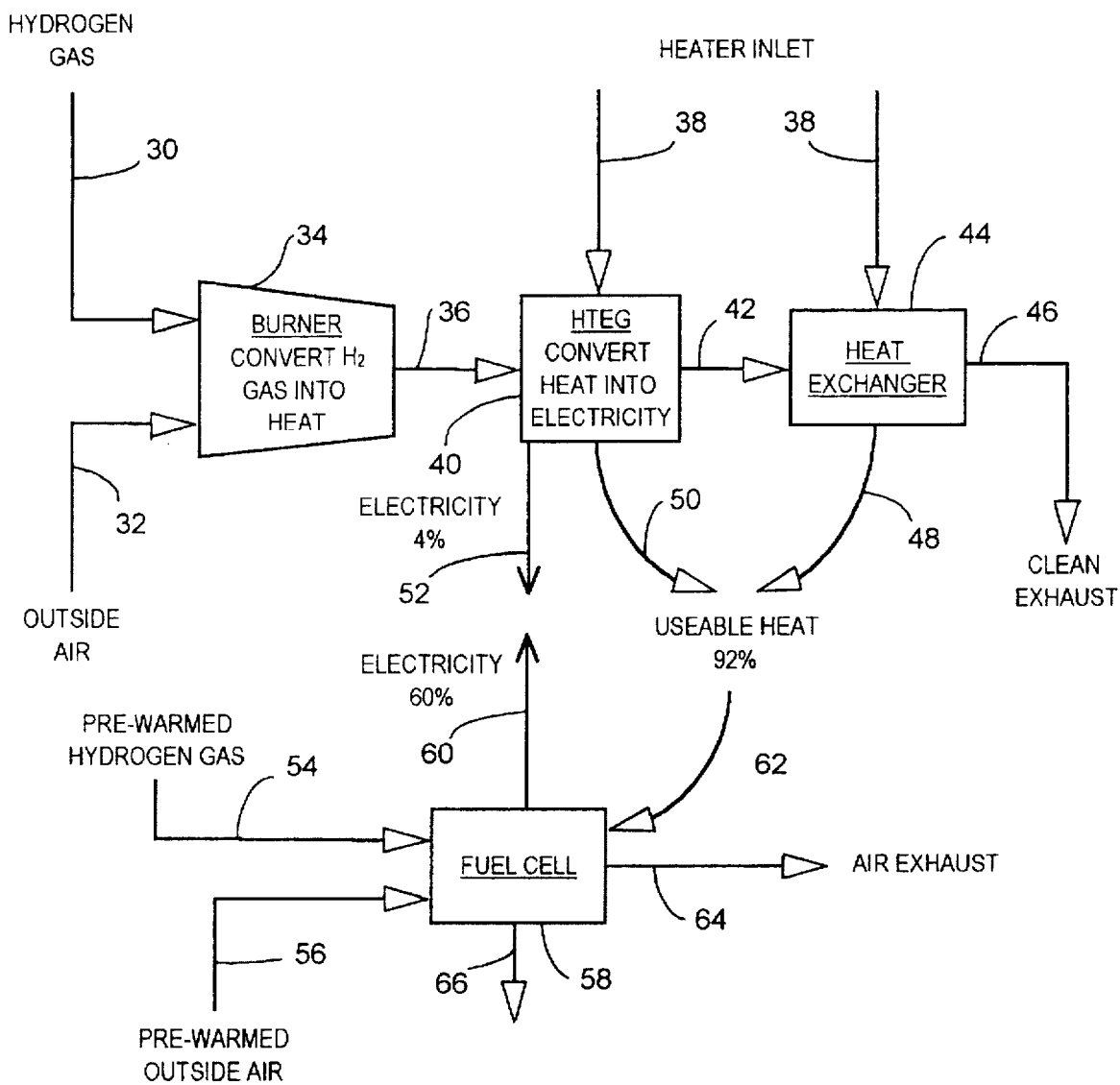
FIG. 3 is a schematic diagram of the electrical, heat and chemical transactions of the system of the embodiment of FIG. 1.

FIG. 3 is a schematic flow diagram of the chemical, thermal and power relationship of the integrated fuel cell based thermoelectric generation system. The power generation system includes a fuel cell stack 58, a catalytic burner module 34, a thermoelectric module 40, and a heat exchanger 44. In addition to the system components, the integrated system includes a fuel (hydrogen) circuit 30 and an oxidant (air containing oxygen) circuit 32. The chemical energy available from the fuel along with oxygen containing air is converted to heat in the catalytic burner module 34. The heat produced from this reaction is converted to electricity by passing it through the thermoelectric module 40. The conversion of fuel to electricity is an inefficient process, typically converting less than 4% of the available energy, with most of the energy converted to heat 42 and the rest of the energy is vented through exhaust vents 50, 48 and 46.

However, the advantage of this waste heat is that it can be utilized to warm the fuel cell stack 58 and peripherals and the electrical power 52 can be used to provide start-up power for parasitic peripherals or as emergency backup power. The processed (heated) fuel stream 54 along with the processed (heated) oxidant stream 56 is fed into a fuel cell 58 which can convert more than 60% of the available energy into electricity 60. Some of the energy is wasted as heat 66 and some leaves via the exhaust vent 64.

Figure 4:
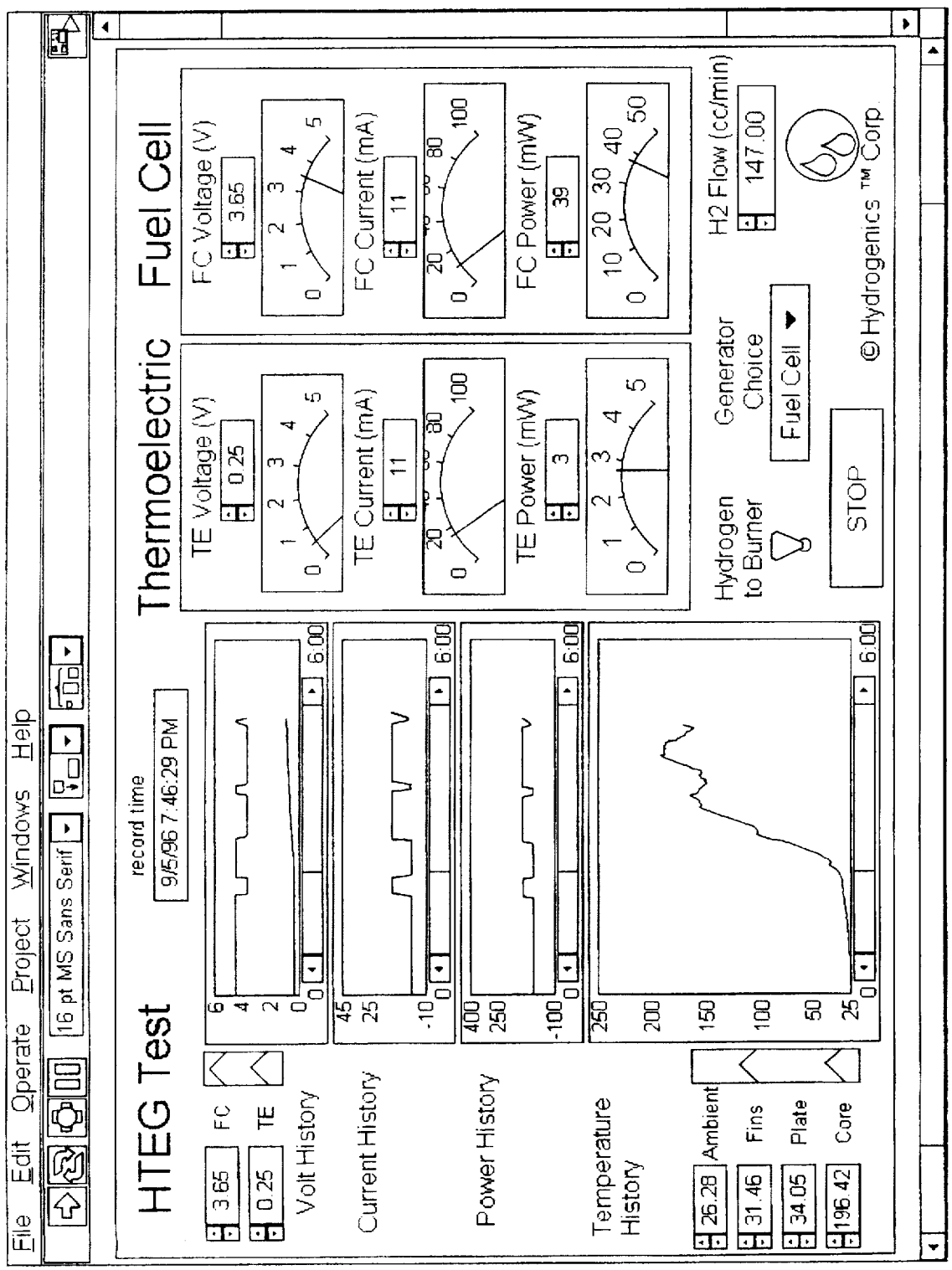
FIG. 4 is a computer display of the embodiment of FIG. 1 illustrating typical graphs of the power source's various parameters.

The display of FIG. 4 present the performance of the preferred embodiment, where the voltage of the two subsystems are plotted against a time scale common to that of the burner's temperature profile. One can observe that the thermoelectric component of the voltage increases with the hot plate's temperature, and that the cooling fins remain within 5° C. of the ambient temperature. The voltage output of the fuel cell is a function of the load imposed on the system, with minimal or no correlation to the burner temperature range.

In the depicted experiment, the fuel cell stack 58 is a 6-cell air-breathing polymer exchange membrane fuel cell stack, and the thermoelectric element 18 is a FRIGICHIP (TM) element from MELCOR. There had been no active circulation of reactant gases for this demonstration. Ambient air at standard temperature and pressure had been convectively consumed from the environment by the fuel cell stack and the catalytic burner. Hydrogen 99.995% pure had been fed dead-ended to the power source at constant, near-atmospheric pressure. The system had been self-starting and provided power on-demand through repetitive cycles shown on the graphs. The burner's thermal plate temperature (hot side of the thermoelectric module) had been maintained within a 15° C. band below and above 250° C. through the on/off modulation of the miniature proportioning valve dispensing hydrogen.

Figure 5:
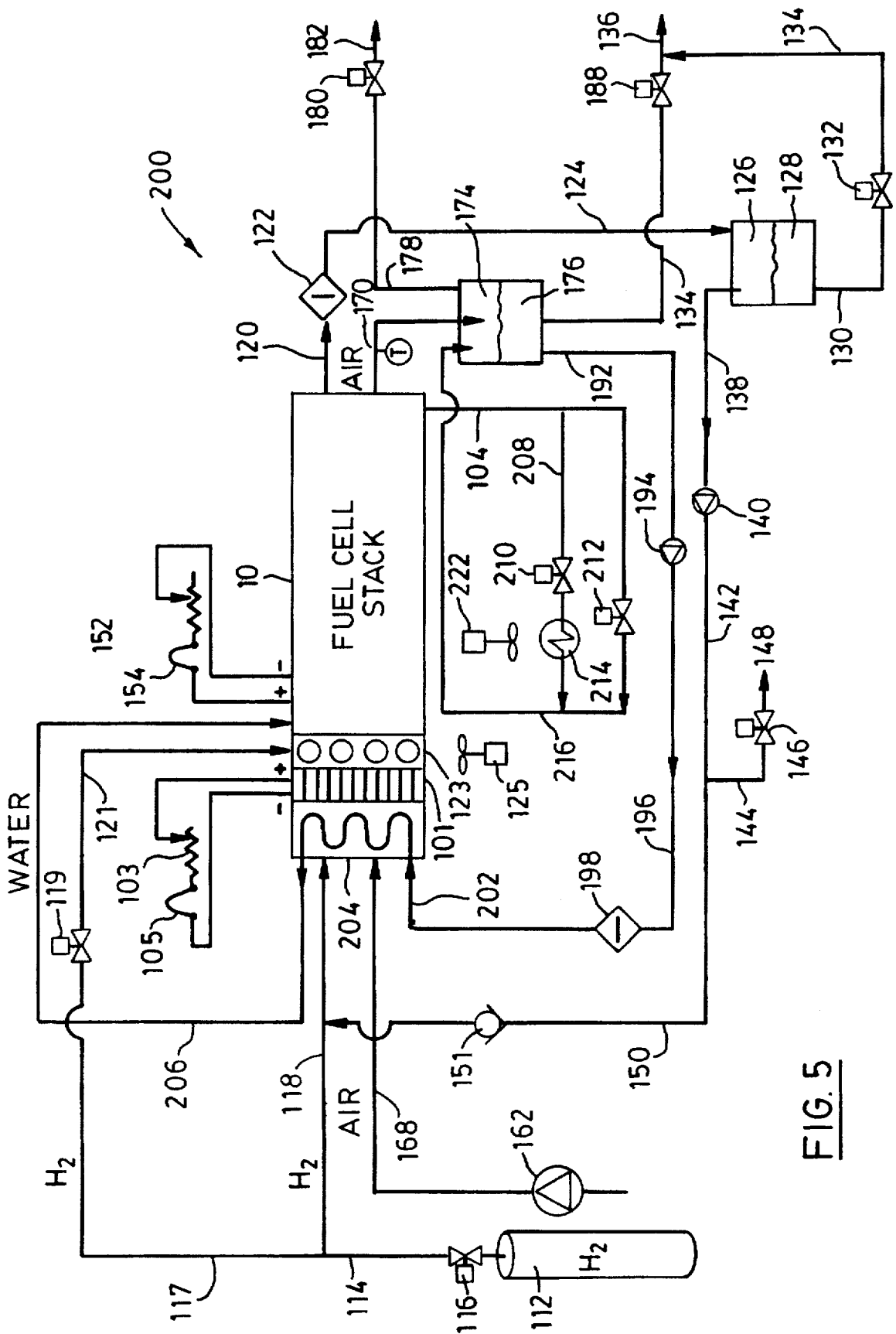
FIG. 5 is a schematic diagram of a second embodiment of the present invention.

In a second embodiment, depicted at FIG. 5, the invention advances a typical fuel cell system such as that disclosed by Watkins et al., U.S. Pat. No. 5,200,278, by providing a catalytic burner to heat the hot side of a thermoelectric element and to warm the fuel cell stack. This embodiment is typical of a retrofit to a bus or an automobile fuel cell application and would advance the design by providing stand-by heat and secondary power during fuel cell shutdown. It is also typical of the retrofit to a stationary fuel cell application whereby auxiliary heat and power during shutdown is provided from the fuel rather than the electrical grid.

FIG. 5 is a schematic diagram of an integrated fuel cell based hydrogen thermoelectric power generation system 200 incorporating fuel cell stack 100 and hydrogen thermoelectric catalytic generator 204, 101 and 123. Fuel cell stack 100 and hydrogen thermoelectric catalytic burner assemblies 101 and 123, respectively, belong to a circuit comprising variable load 103 and 152 respectively and contactor switch 105 and 154 are electrically connected. In addition to the fuel cell stack 100 and hydrogen thermoelectric catalytic generator modules 123 and 101, the integrated system includes a fuel (hydrogen) circuit, an oxidant (air containing oxygen) circuit and a coolant (water) circuit.

The fuel circuit of system 200 illustrated in FIG. 5 includes a pressurized substantially pure hydrogen supply 112 having fuel feed line 114 associated therewith. On-off valve 116 actuates the flow of fuel from supply 112. Fuel inlet stream 118 enters heat exchanger 204 where the fuel can be pre-warmed with heat produced from the catalytic burner 123 before entering fuel cell stack 100. Humidified fuel outlet stream 120 exits fuel cell stack 100 and passes through a deionizing filter 122. Humidified fuel outlet stream 124 is fed to a water separator 126 in which a portion of the water from stream 124 is removed and accumulated in reservoir 128. Periodically the removed water is drained from reservoir 128 through water drain lines 130, 134, 136 by actuation of valve 132.

The dehumidified fuel stream 138 is recirculated by pump 140 through return lines 142 and 150 to fuel inlet stream 118. Return line 150 preferably includes a check valve 151. Periodically purging of the fuel stream line 142 is accomplished using line 144 having purge valve 146 to expel contaminants through 148.

The oxidant circuit of system 200 includes an air compressor 162 having an oxidant feed line 168 associated therewith. Oxidant inlet stream 168 enters heat exchanger 204 where the oxidant can be pre-heated before entering fuel cell stack 100. Oxidant outlet stream 170 exiting fuel cell stack 100 contains, in addition to the unreacted gases, water from humidification and entrained water. A thermocouple 172 measures the temperature of oxidant outlet stream 170. This temperature measurement can either actuate an air circulation system associated with the coolant heat exchanger 222 as described below if the temperature is too high or actuate catalytic burner hydrogen on-off valve 119 which will pre-heat in-coming oxidant flow for cold start-up situations.

The humidified oxidant stream 170 exiting fuel cell stack 100 is directed to water separator 174. Water separator 174 removes the absorbed and entrained water from stream 170. The removed water is accumulated in reservoir 176. The water is periodically drained from reservoir 176 through drain lines 134 and 136 and valve 188.

The oxidant in the illustrated embodiment is a dilute reactant and therefore it is not circulated. Instead the air stream is vented to the atmosphere through exhaust line 178, valve 180 and line 182.

The coolant circuit of system 200 in the illustrated embodiment derives its coolant fluid from water removed from the humidified oxidant stream 170 and accumulated in reservoir 176. As shown in FIG. 5, coolant water stream 192 exits reservoir 176 and is pumped through water circulation pump 194 to a deionization filter 198 through line 196. The deionized coolant stream 202 is fed to the hydrogen heat exchanger 204. If the coolant water stream 192 is below the operating temperature of the stack 100, which is often experienced during start-up in cold climates, the catalytic burner 123 is turned on by allowing hydrogen or a hydrogen-air mixture to flow from hydrogen stream 117. The heat produced by catalytic burner 123 is transferred to the hot side of thermoelement 101 which in turn is transferred to heat exchanger 204 by the flow of coolant water stream 202. The electricity produced is used to power the water circulation pump 194. The pre-heated coolant water stream 202 is then led into fuel cell stack 100.

Air circulation fan 222 is turned on if the coolant water stream exiting fuel cell stack 100 is above a predetermined value. Alternate temperature controls are possible.

Figure 6:
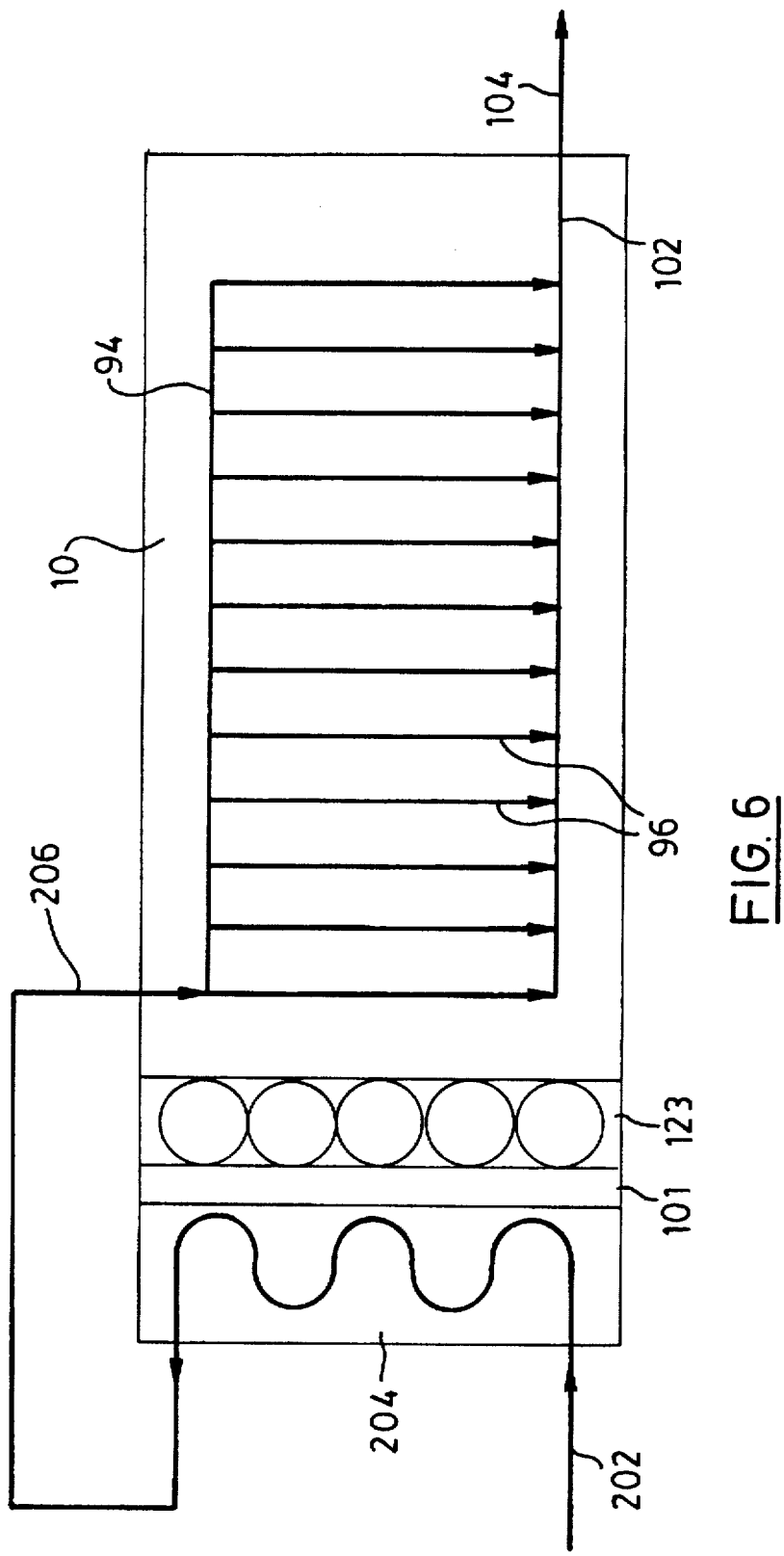
FIG. 6 is a schematic diagram of the flow diagram of the combined coolant water stream through a heat exchanger and an active section of fuel cell stack of FIG. 5.

FIG. 6 is a schematic flow diagram of the combined coolant water stream through the heat exchanger 204 and active section of fuel cell stack 100. Water inlet stream 202 enters heat exchanger 204 where if hydrogen catalytic burner 123 is turned on, water coolant stream 202 will absorb heat generated by the burner necessary to pre-warm fuel cell stack 100 or provide necessary heat to sustain fuel cell stack 100 in case of malfunction or necessary shut down during cold weather. The water stream 206 enters fuel cell stack 100 and is directed through water inlet manifold 94 to coolant water channels 96 within the active section of fuel cell stack 100. During cold weather start-up or in case of fuel cell 100 malfunction, the water stream within coolant channels 96 is able to transfer heat absorbed in heat exchanger 204 to the active section of fuel cell stack 100. Water manifold 102 directs the water stream exiting coolant channels 96 to the coolant water outlet stream 104.

Figure 7:
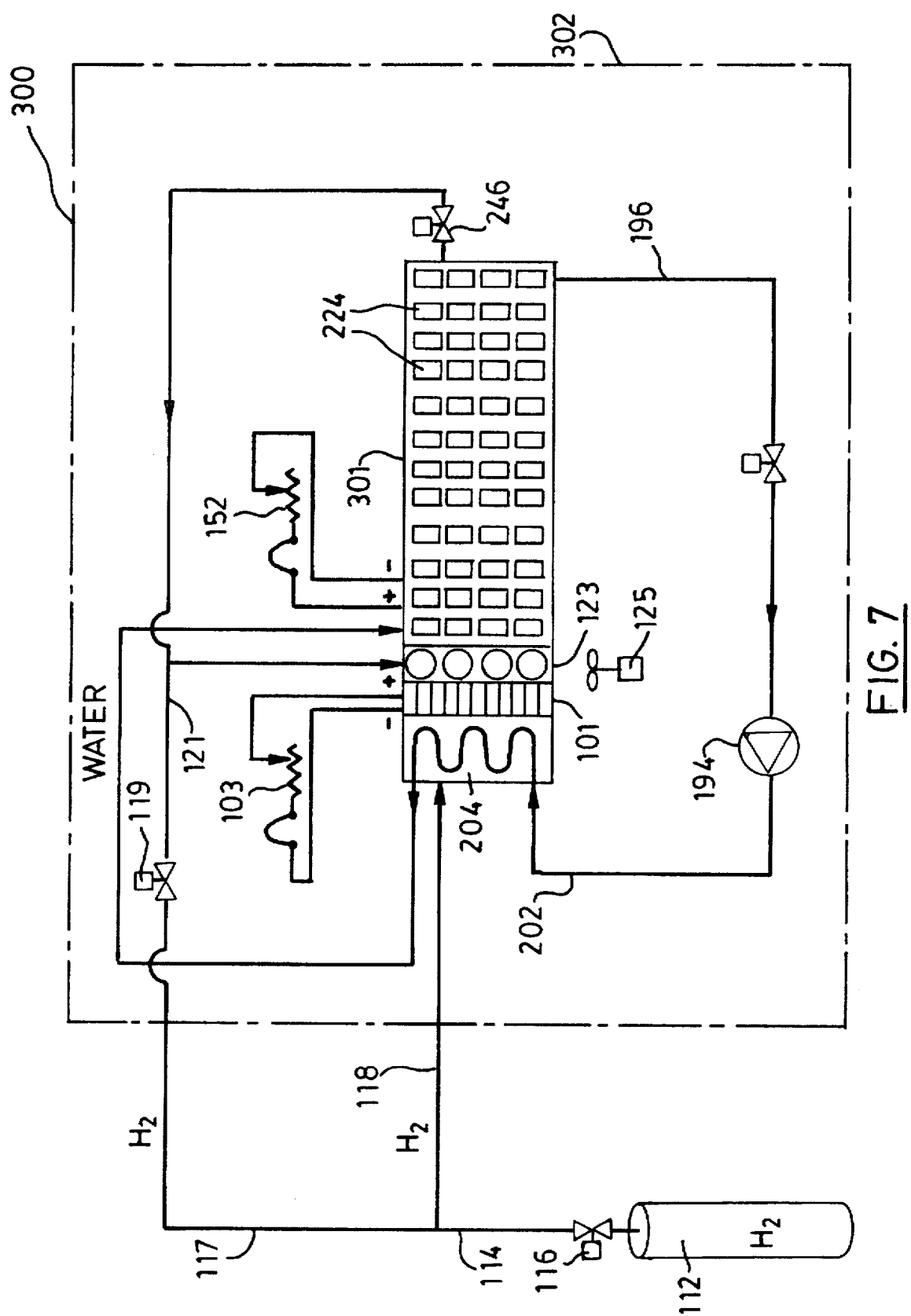
FIG. 7 is a schematic diagram of a third embodiment of the present invention.

In a third embodiment, depicted in FIG. 7, an air-breathing hydrogen dead-ended fuel cell stack 301, a thermoelectric generator 101 and a catalytic burner 123 are combined to create an integrated power generation system that can operate in sub-zero temperatures. In addition to the fuel cell stack 301, thermoelectric generator 101 and catalytic burner 123, the integrated system includes a fuel (hydrogen) circuit, an oxidant (air containing oxygen) and a heat transfer fluid (ethylene glycol) circuit. Optionally, the heat transfer fluid could be the same water used to humidify the fuel cell stack 301.

The fuel circuit of system 300 illustrated in FIG. 7 includes pressurized substantially pure hydrogen supply 112 having fuel feed line 114 associated therewith. On-off valve 116 actuates the flow of fuel from supply 112. Fuel inlet stream 118 enters heat exchanger 204 where it can be pre-warmed with heat produced from the hydrogen catalytic burner 123 and then it enters the fuel cell stack 301. Periodically purging of the fuel cell stack 301 is accomplished using purge valve 246 to expel contaminants which are consumed by the burner 123.

The oxidant circuit of system 300 does not require any compressors or pressurized oxidant supply because of its air breathing design. Air enters the fuel cell stack 301 via air inlet ports 224.

The heat transfer circuit of system 300 in the illustrated embodiment is a closed loop circuit. As shown in FIG. 7, heat transfer fluid stream 196 is pumped through water circulation pump 194 through line 202. The heat transfer fluid is fed to the heat exchanger 204. If conditions warrant and the hydrogen burner 123 is activated producing heat and electricity from the thermoelectric generator 101, heat transfer fluid in heat exchanger 204 absorbs heat and is then distributed through fuel cell stack 301 similar to the coolant stream flow pattern of FIG. 5 heating the active area of fuel cell stack 301. Once the temperature of the fuel cell stack 301 reaches a predetermined value, of about 60° C., hydrogen burner 123 can be turned off by closing valve 119 which stops the flow of hydrogen to the burner.

In the special case of a fuel cell malfunction while operating in cold climates, the hydrogen thermoelectric burner assembly of the system is simply activated by opening on-off valve 119 which actuates the flow of fuel from supply line 117. The heat produced from the catalytic burner 123 supplies thermoelectric generator 101 which provides the system with emergency power.

The heat can also be transferred to the heat transfer fluid and then circulated according to FIG. 6 through the fuel cell stack 301 saving the stack from sub-zero temperature damage by keeping it warm. As a further benefit from the system, circulation fan 125 can be actuated and used to distribute heat throughout the system enclosure 302 ensuring system protection from sub-zero temperatures maintaining an optimum operating temperature of the system.

It is now readily apparent that the above description of the fuel cell stack and unit fuel cell components is to a preferred embodiment and that the invention is not limited to the specific exemplary materials. For example, the fuel cell stack could be assembled on the annular feed air breathing design of Wilson U.S. Pat. No. 5,514,486 or Dahr's rectangular "chimney" grooves U.S. Pat. No. 5,242,764. Further, the catalytic beads or pads of the burner could be replaced, for example, by a catalytic mesh surface. The MELCOR thermoelectric elements could be replaced, for example, by Brown-Teledyne elements. The fuel could be provided from a hydride canister available from Hydrogen Consultants Inc. of Littleton, Colo., or from AF Sammer of Ringwood, N.J., rather than from a pressurized bottle. Further, the fuel could also include methane or any other fuel from which hydrogen can be derived.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications or omissions as are suited to the particular use contemplated, without departing from the spirit and the scope of the invention.

We claim:

1. A method of generating heat and electrical energy, comprising the steps of supplying a first fuel to a burner for generating a temperature differential across a thermoelectric element generating electricity for secondary power, and for pre-heating a second fuel, said pre-heating comprising primary heat, supplying said second fuel to a fuel cell stack for generating electricity for primary power and secondary heat.

2. A method as claimed in claim 1 wherein said method further comprises a step of cooling one side of said thermoelectric element to increase said temperature differential.

3. A method as claimed in claim 1 wherein said first fuel and said second fuel are supplied from a common source.

4. A method as claimed in claim 1 wherein said method further comprises a step of regulating said first fuel to maintain an optimal operating temperature.

5. A method as claimed in claim 1 wherein said method further includes a step of extracting said primary and secondary power and heat.

* * * * *